US009652637B2

(12) United States Patent
Dellow et al.

(10) Patent No.: US 9,652,637 B2
(45) Date of Patent: May 16, 2017

(54) METHOD AND SYSTEM FOR ALLOWING NO CODE DOWNLOAD IN A CODE DOWNLOAD SCHEME

(75) Inventors: Andrew Dellow, Minchinhampton (GB); Iue-Shuenn Chen, San Diego, CA (US); Stephane (Steve) Rodgers, San Diego, CA (US); Xuemin (Sherman) Chen, San Diego, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 2058 days.

(21) Appl. No.: 11/740,575

(22) Filed: Apr. 26, 2007

(65) Prior Publication Data

US 2008/0271164 A1  Oct. 30, 2008

Related U.S. Application Data

(63) Continuation-in-part of application No. 11/136,027, filed on May 23, 2005, now Pat. No. 7,844,996.

(51) Int. Cl.
*G06F 21/76*  (2013.01)
*G06F 9/44*  (2006.01)

(52) U.S. Cl.
CPC .......... *G06F 21/76* (2013.01); *G06F 9/4403* (2013.01)

(58) Field of Classification Search
CPC ...................................................... G06F 21/76
See application file for complete search history.

(56) References Cited

U.S. PATENT DOCUMENTS

| 5,014,191 A | 5/1991 | Padgaonkar et al. |
| 5,206,714 A | 4/1993 | Kim |
| 5,319,705 A | 6/1994 | Halter et al. |
| 5,530,749 A | 6/1996 | Easter |

(Continued)

FOREIGN PATENT DOCUMENTS

| EP | 1 612 684 A1 | 1/2006 |
| EP | 1 612 684 B1 | 9/2009 |

(Continued)

OTHER PUBLICATIONS

FreeDictionaryOnline, "Definition of computer code", 2013.*

(Continued)

*Primary Examiner* — Bradley Holder
(74) *Attorney, Agent, or Firm* — Sterne, Kessler, Goldstein & Fox PLLC

(57) ABSTRACT

Aspects of a method and system for allowing no code download in a code download scheme are provided. A system-on-a-chip (SoC) may comprise a security processor, a ROM, and a one-time-programmable (OTP) memory. The security processor may enable fetching code from a restricted function portion of the ROM. The restricted functions may comprise code for booting up the SoC and code that prevents enabling security algorithms within the SoC. The security processor may then enable booting up of at least a portion of the SoC based on the fetched code. The remaining portion of the ROM may comprise code for downloading security code from an external memory, such as a FLASH memory, to an internal memory, such as a RAM, to boot up the SoC. Access to the restricted function portion or the remaining portion of the ROM is based on at least one bit from the OTP memory.

24 Claims, 7 Drawing Sheets

(56) References Cited

U.S. PATENT DOCUMENTS

| | | | |
|---|---|---|---|
| 5,557,743 A | 9/1996 | Pombo et al. | |
| 5,623,637 A * | 4/1997 | Jones et al. | 711/164 |
| 5,771,287 A | 6/1998 | Gilley et al. | |
| 5,832,207 A | 11/1998 | Little et al. | |
| 5,933,087 A | 8/1999 | Wright | |
| 6,028,937 A | 2/2000 | Tatebayashi et al. | |
| 6,038,563 A | 3/2000 | Bapat et al. | |
| 6,182,089 B1 | 1/2001 | Ganapathy et al. | |
| 6,279,063 B1 | 8/2001 | Kawasaki et al. | |
| 6,317,849 B1 | 11/2001 | Patel | |
| 6,381,747 B1 | 4/2002 | Wonfor et al. | |
| 6,434,077 B1 | 8/2002 | Holmes | |
| 6,466,048 B1 | 10/2002 | Goodman | |
| 6,586,968 B1 | 7/2003 | Schauer et al. | |
| 6,686,768 B2 | 2/2004 | Comer | |
| 6,785,721 B1 | 8/2004 | Immerman et al. | |
| 6,850,252 B1 | 2/2005 | Hoffberg | |
| 6,880,005 B1 | 4/2005 | Bell et al. | |
| 6,880,113 B2 | 4/2005 | Anderson et al. | |
| 6,948,183 B1 | 9/2005 | Peterka | |
| 6,950,818 B2 | 9/2005 | Dennis et al. | |
| 6,970,462 B1 | 11/2005 | McRae | |
| 6,992,945 B2 | 1/2006 | Otsuka | |
| 7,147,558 B2 | 12/2006 | Giobbi | |
| 7,167,077 B2 | 1/2007 | Grassl | |
| 7,176,791 B2 | 2/2007 | Sakaki et al. | |
| 7,227,842 B1 | 6/2007 | Ji et al. | |
| 7,236,493 B1 | 6/2007 | McRae | |
| 7,263,367 B1 | 8/2007 | Sabot | |
| 7,317,723 B1 | 1/2008 | Guru | |
| 7,340,469 B1 | 3/2008 | Alghathbar et al. | |
| 7,350,204 B2 | 3/2008 | Lambert et al. | |
| 7,409,707 B2 | 8/2008 | Swander et al. | |
| 7,444,682 B2 | 10/2008 | Li et al. | |
| 7,445,148 B2 | 11/2008 | Uchida et al. | |
| 7,484,237 B2 | 1/2009 | Joly et al. | |
| 7,487,424 B2 | 2/2009 | Nam et al. | |
| 7,489,779 B2 | 2/2009 | Scheuermann | |
| 7,490,333 B2 | 2/2009 | Grimaud et al. | |
| 7,509,673 B2 | 3/2009 | Swander et al. | |
| 7,518,605 B2 | 4/2009 | Lin et al. | |
| 7,549,159 B2 | 6/2009 | Shay | |
| 7,565,553 B2 * | 7/2009 | Hunter et al. | 713/192 |
| 7,590,860 B2 | 9/2009 | Leporini et al. | |
| 7,624,424 B2 | 11/2009 | Morita et al. | |
| 7,647,329 B1 | 1/2010 | Fischman et al. | |
| 7,844,996 B2 | 11/2010 | Chen et al. | |
| 7,913,289 B2 | 3/2011 | Chen et al. | |
| 8,347,357 B2 | 1/2013 | Chen et al. | |
| 9,177,176 B2 | 11/2015 | Chen | |
| 9,489,318 B2 | 11/2016 | Chen | |
| 2002/0059623 A1 | 5/2002 | Rodriguez et al. | |
| 2002/0099952 A1 | 7/2002 | Lambert et al. | |
| 2002/0138749 A1 | 9/2002 | Koguchi et al. | |
| 2002/0184512 A1 | 12/2002 | Cardoso, Jr. | |
| 2003/0041267 A1 | 2/2003 | Fee et al. | |
| 2003/0065982 A1 | 4/2003 | Grimaud et al. | |
| 2003/0070091 A1 | 4/2003 | Loveland | |
| 2003/0081784 A1 | 5/2003 | Kallahalla et al. | |
| 2003/0088786 A1 | 5/2003 | Moran et al. | |
| 2003/0115417 A1 | 6/2003 | Corrigan | |
| 2003/0140245 A1 | 7/2003 | Dahan et al. | |
| 2003/0217322 A1 * | 11/2003 | Rodgers | 714/763 |
| 2003/0221030 A1 | 11/2003 | Pontius et al. | |
| 2003/0226029 A1 | 12/2003 | Porter et al. | |
| 2004/0086127 A1 | 5/2004 | Candelore | |
| 2004/0088558 A1 | 5/2004 | Candelore | |
| 2004/0170068 A1 | 9/2004 | Williams | |
| 2004/0190558 A1 | 9/2004 | Oliver | |
| 2004/0250131 A1 | 12/2004 | Swander et al. | |
| 2005/0010765 A1 | 1/2005 | Swander et al. | |
| 2005/0021980 A1 | 1/2005 | Kanai | |
| 2005/0022010 A1 | 1/2005 | Swander et al. | |
| 2005/0114616 A1 | 5/2005 | Tune et al. | |
| 2005/0144475 A1 | 6/2005 | Sakaki et al. | |
| 2005/0213766 A1 | 9/2005 | Goss | |
| 2005/0234907 A1 | 10/2005 | Yamagishi et al. | |
| 2005/0242924 A1 | 11/2005 | Yosim et al. | |
| 2005/0262132 A1 | 11/2005 | Morita et al. | |
| 2005/0262569 A1 | 11/2005 | Shay | |
| 2005/0262570 A1 | 11/2005 | Shay | |
| 2005/0268342 A1 | 12/2005 | Shay | |
| 2005/0278483 A1 | 12/2005 | Andruszkiewicz et al. | |
| 2006/0004536 A1 | 1/2006 | Diamond | |
| 2006/0015947 A1 * | 1/2006 | Conti et al. | 726/34 |
| 2006/0031685 A1 | 2/2006 | Chen et al. | |
| 2006/0044861 A1 | 3/2006 | Smith et al. | |
| 2006/0075508 A1 | 4/2006 | Guo et al. | |
| 2006/0090084 A1 | 4/2006 | Buer | |
| 2006/0145291 A1 | 7/2006 | Badami et al. | |
| 2006/0149958 A1 * | 7/2006 | Omathuna | 713/2 |
| 2006/0161829 A1 | 7/2006 | Kobayashi | |
| 2006/0236408 A1 | 10/2006 | Van | |
| 2006/0265733 A1 | 11/2006 | Chen et al. | |
| 2006/0265734 A1 * | 11/2006 | Chen et al. | 726/2 |
| 2006/0272027 A1 | 11/2006 | Noble | |
| 2006/0294575 A1 | 12/2006 | Rogers | |
| 2007/0157000 A1 | 7/2007 | Qawami et al. | |
| 2007/0169173 A1 | 7/2007 | Brown et al. | |
| 2007/0176756 A1 * | 8/2007 | Friedrich | 340/10.51 |
| 2007/0192839 A1 | 8/2007 | Fee et al. | |
| 2007/0209072 A1 | 9/2007 | Chen | |
| 2007/0290715 A1 | 12/2007 | Baer et al. | |
| 2007/0294497 A1 | 12/2007 | Chen | |
| 2007/0294745 A1 | 12/2007 | Tan et al. | |
| 2008/0005586 A1 * | 1/2008 | Munguia | 713/189 |
| 2009/0285280 A1 | 11/2009 | Newberry et al. | |
| 2009/0313461 A1 | 12/2009 | Klug | |
| 2011/0197069 A9 | 8/2011 | Rodgers et al. | |

FOREIGN PATENT DOCUMENTS

| | | |
|---|---|---|
| WO | WO 97/25675 A1 | 7/1997 |
| WO | WO 99/14881 A2 | 3/1999 |

OTHER PUBLICATIONS

Federal Information Processing Standards Publication, Fips Pub 46-3, *Data Encryption Standard (DES)*, Oct. 25, 1999.

European Patent Office Communication pursuant to Article 94(3) EPC, corresponding to European Patent Application Serial No. 06021663.7-2212, dated Mar. 16, 2010, 3 pages.

Extended European Search Report, corresponding to European Patent Application Serial No. 06021663.7-2212, dated Dec. 16, 2008, 3 pages.

European Patent Office Communication pursuant to Article 94(3) EPC, corresponding to European Patent Application Serial No. 07000798.4-1245, dated Jul. 23, 2010, 7 pages.

* cited by examiner

METHOD AND SYSTEM FOR ALLOWING NO CODE DOWNLOAD IN A CODE DOWNLOAD SCHEME

CROSS-REFERENCE TO RELATED APPLICATIONS/INCORPORATION BY REFERENCE

The present application is a continuation-in-part of application Ser. No. 11/136,027, filed on May 23, 2005 now U.S. Pat. No. 7,844,996.

FIELD OF THE INVENTION

Certain embodiments of the invention relate to security functionalities in integrated circuits. More specifically, certain embodiments of the invention relate to a method and system for allowing no code download in a code download scheme.

BACKGROUND OF THE INVENTION

In an increasingly security-conscious world, protecting access to information and/or to systems from unwanted discovery and/or corruption is a major issue for both consumers and businesses. Many consumer or business systems may be vulnerable to unwanted access when the level of security provided within the system is not sufficient for providing the appropriate protection. In this regard, consumer systems, such as multimedia systems, for example, may require the use of integrated architectures that enable security management mechanisms for defining and administering user rights or privileges in order to provide the necessary protection from unwanted access.

An example of a multimedia system that may be accessed by many different users may be a set-top box where manufacturers, vendors, operators, and/or home users may have an interest in accessing at least some limited functionality of the system. In some instances, a single device, such as a security processor for example, may be utilized to administer security operations in the multimedia system. The security processor may operate independently of other components in the multimedia system when determining rights or privileges of different users such as vendors and/or end users to various features in the multimedia system. For example, vendors may have limited access to some of the functions that may be accessible by the manufacturer. End users such as home users may only have access to a subset of the vendors' access rights. Also, some vendors may only have access to a subset of the access rights that may be provided by a manufacturer. In some instances, secure operations may be managed by specifying, in a single location, secure conditions for each security component supported by the system.

However, there are still users of multimedia systems who may have limited or no security requirements in their applications. Nevertheless, these users may utilize multimedia systems with integrated architectures that enable security management mechanisms for defining and administering user rights or privileges. Security-enabled multimedia systems may require boot up code that may be significantly more complex than what may be generally needed for non-secure applications. Moreover, the technical and maintenance support that may be needed for security-enabled multimedia systems may be more costly and/or may be provided in a more limited capacity to a user who utilizes them in non-secure applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for allowing no code download in a code download scheme, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for allowing no code download in a code download scheme. Aspects of the invention may comprise a multimedia system-on-a-chip (SoC) that comprises a security processor, a ROM, and a one-time-programmable (OTP) memory. The security processor may enable fetching code from a restricted function portion of the ROM. The restricted functions may comprise code for booting up the SoC and/or code that prevents enabling security algorithms within the SoC. The security processor may then enable booting of at least a portion of the SoC based on the fetched code. The remaining portion of the ROM may comprise code for downloading security code from an external memory, such as a FLASH memory, to an internal memory, such as a RAM, to boot up the SoC. Access to the restricted function portion or the remaining portion of the ROM may be based on at least one bit from the OTP memory.

Figure 1:
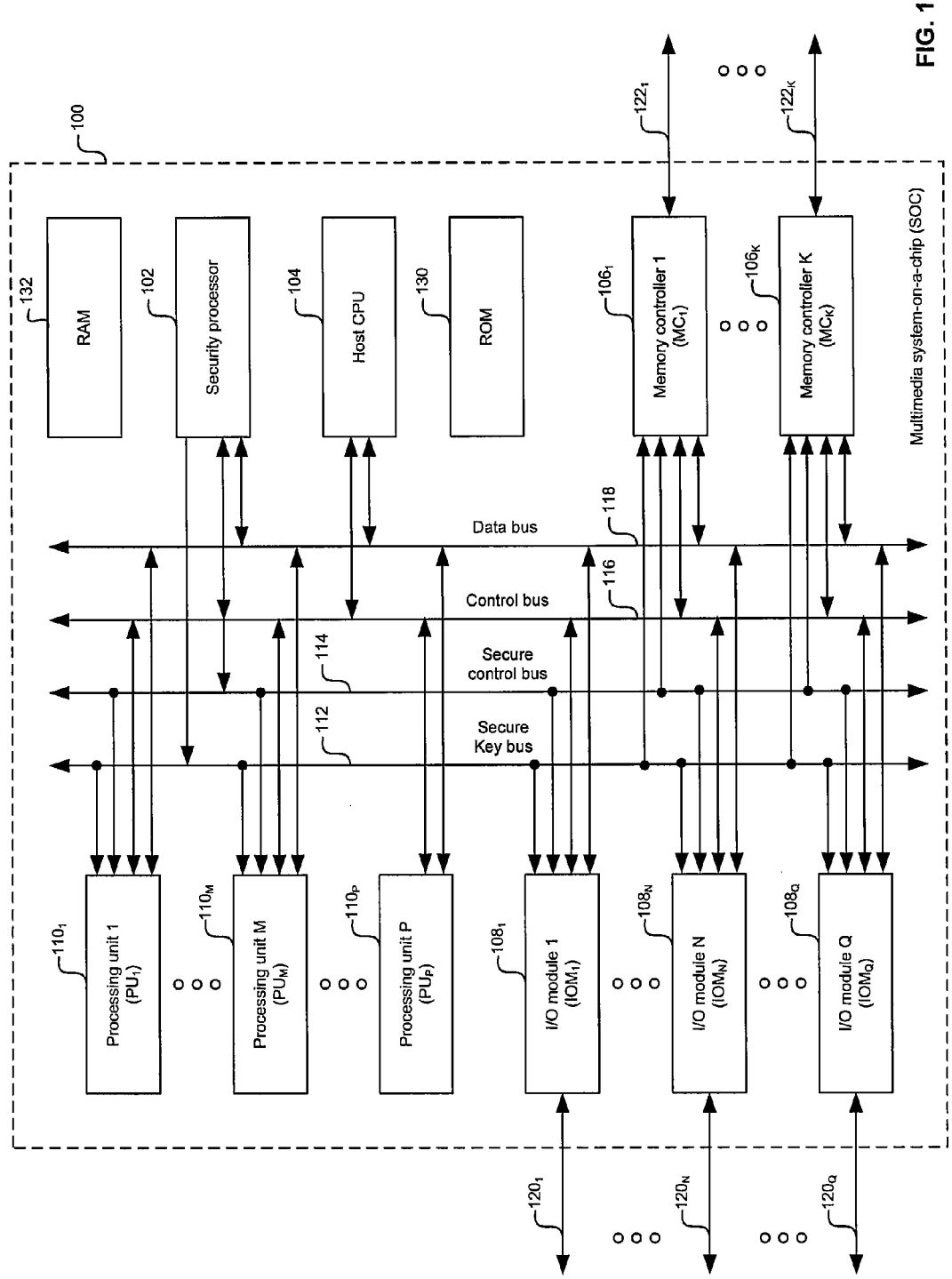
FIG. 1 is a block diagram illustrating an exemplary secure multimedia system-on-a-chip (SoC) architecture, in accordance with an embodiment of the invention.

FIG. 1 is a block diagram illustrating an exemplary secure multimedia SoC architecture, in accordance with an embodiment of the invention. Referring to FIG. 1, there is shown an SoC 100 that may be implemented as a single integrated chip, for example. The SoC 100 may comprise at least one memory controller (MC) 106, at least one input/output (I/O) module (IOM) 108, at least one processing unit (PU) 110, a security processor 102, a host processor 104, a secure key bus 112, a secure control bus 114, a control bus 116, a data bus 118, a ROM 130, and a RAM 132. In the exemplary embodiment described in FIG. 1, the SoC 100 may comprise a plurality of processing units $PM_1$ $110_1$, . . . , $PU_M$ $110_M$, . . . , $PU_P$ $110_P$, a plurality of I/O modules $IOM_1$ $108_1$, . . . , $IOM_N$ $108_N$, . . . , $IOM_Q$ $108_Q$, and a plurality of memory controllers $MC_1$ $106_1$, . . . . $MC_K$ $106_K$. The bus architecture provided by the SoC 100 may enable scalability and may easily support the addition and/or removal of components.

The ROM 130 may comprise suitable logic, circuitry, and/or code that may enable storing information. For example, the ROM 130 may be utilized to store instructions that may be utilized by the security processor 102 for enabling steps utilized in booting up the SoC 100. In this regard, the ROM 130 may be partitioned into a plurality of portions wherein each partition may correspond to a different booting mode for the SoC 100. The RAM 132 may comprise suitable logic, circuitry, and/or code that may be utilized for storing information. For example, the RAM 132 may be utilized for storing security code fetched from external memory by the security processor 102 for enabling steps utilized in booting up the SoC 100.

A memory controller 106 may comprise suitable logic, circuitry, and/or code that may enable accessing data from memory and/or storing data to memory. In this regard, the plurality of memory controllers $MC_1$ $106_1$, . . . , $MC_K$ $106_K$, described with regard to FIG. 1 may utilize bidirectional interfaces $122_1$, . . . , $122_K$, respectively, to communicate with memory. An example of a memory controller 106 may be a 32-bit double data rate (DDR) memory controller. A processing unit 100 may comprise suitable logic, circuitry, and/or code that may enable processing of multimedia data. For example, a PU 100 may be an MPEG video or audio decoder that may be implemented in hardware as an application specific integrated circuit (ASIC) module or in a program as software/firmware executed in an integrated digital signal processor (DSP). An I/O module 108 may comprise suitable logic, circuitry, and/or code that may enable communication with devices external to the SoC 100. In this regard, the plurality of plurality of I/O modules $IOM_1$ $108_1$, . . . , $IOM_N$ $108_N$, . . . , $IOM_Q$ $108_Q$, described in FIG. 1 may utilize bidirectional interfaces $120_1$, . . . , $120_N$, . . . , $120_Q$, respectively, to communicate with devices external to the SOC 100. An example of an I/O module 108 may be a universal serial bus (USB) 2.0 interface.

The security processor 102 may comprise suitable logic, circuitry, and/or code that may enable control, configuration, and/or management of security operations and/or functionalities in the SoC 100. In this regard, the security processor 102 may communicate security information to memory controllers, I/O modules, and/or processing units via at least one of the secure key bus 112 and the secure control bus 114. The security processor 102 may also communicate with the host processor 104 via at least one of the control bus 116 and the data bus 118. In some instances, the security processor 102 may be disabled and the SoC 100 may be operated as a multimedia device with minimum security features controlled by the host processor 104. In other instances, the security processor 102 may be utilized to restrict or limit the operation of the SoC 100 to that of a multimedia device with minimum security features. In some instances, for example, minimum security features may correspond to enabling the security processor 102 to boot up the SoC 100 without enabling proprietary security applications integrated within the SoC 100. For example, the security processor 102 may enable operations within the SoC 100 that may be supported by the data bus 118 and/or the control bus 116 but that may not be supported by the secure key bus 112 and/or the secure control bus 114. Notwithstanding, the invention need not be so limited.

The processor 104 may comprise suitable logic, circuitry, and/or code that may enable control and/or management of operations in the SoC 100. In this regard, the processor 104 may be utilized for configuring SoC 100 components, such as memory controllers, I/O modules, and/or processing units, for example. The processor 104 may communicate with SoC 100 components via at least one of the control bus 116 and the data bus 118. In this regard, the processor 104 may communicate with the security processor 102 via the control bus 116 and the data bus 118.

The data bus 118 may be utilized for multimedia data transfer between components in the SoC 100. The control bus 116 may be utilized for control and configuration data transfer. For example, the control bus 116 may be utilized to read and/or write to registers. The secure control bus 114 may be utilized for security control and configuration data transfer. For example, the secure control bus 114 may be utilized to read and/or write to secure registers. In this regard, the secure control bus 114 may be communicatively coupled to components of the SoC 100 that may require secure registers and/or secure data access. The secure key bus 112 may be a dedicated bus, which may be utilized for delivering encryption and/or decryption keys to functional units that may require keys for cryptographic operations, such as block cipher operations, for example. For example, the processing unit $PU_P$ $100_P$ in FIG. 1 may not utilize encryption and/or decryption keys and need not be connected to the secure key bus 112. Moreover, the processing unit $PU_P$ $100_P$ may not require security control and configuration data transfer and need not be connected to the secure control bus 114, for example.

The bus architecture of the SoC 100 need not be limited to the exemplary architecture described in FIG. 1. For example, the secure control bus 114 may be implemented as a secure part or band of the control bus 116. A secure part or band may refer to a portion of the control bus 116 that may be utilized for communicating secure control information, for example. In another example, the functions provided by the data bus 118 may be implemented by a plurality of data buses based on the different types of data being processed in the SoC 100, wherein the plurality of data buses may be connected via bus bridges.

In some instances, there may be users that utilize the secure multimedia SoC 100 who may have limited or no security requirements in their applications. In this regard, the boot up code for the secure multimedia SoC 100 may be significantly more complex than what may be generally needed for multimedia systems with limited or no security features that are utilized in non-secure applications. Moreover, the technical and maintenance support that may be needed for the secure multimedia SoC 100 may be more costly and/or may be provided in a more limited capacity to a user who utilizes the secure multimedia SoC in non-secure applications.

Figure 2A:
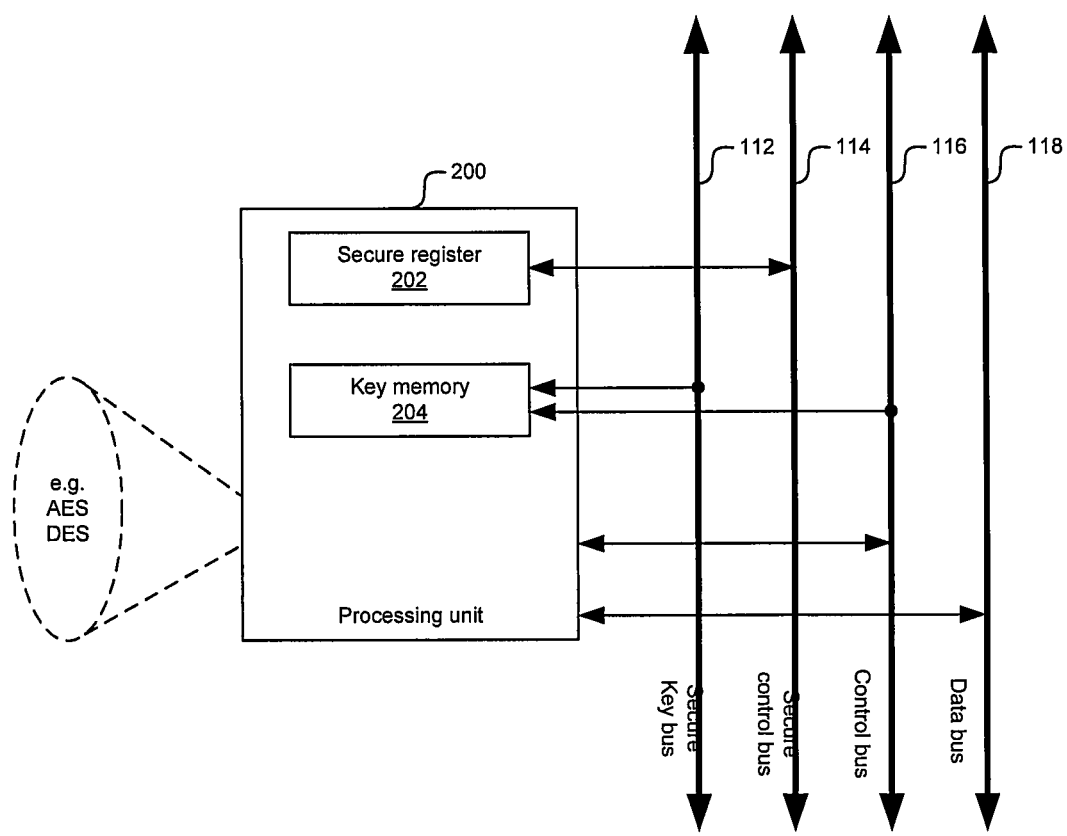
FIG. 2A is a block diagram illustrating an exemplary processing unit in a secure multimedia SoC, in accordance with an embodiment of the invention.

FIG. 2A is a block diagram illustrating an exemplary processing unit in a secure multimedia SoC, in accordance with an embodiment of the invention. Referring to FIG. 2A, there is shown a processing unit 200 that may comprise a secure register 202 and a key memory 204. The processing unit 200 may comprise suitable logic, circuitry, and/or code that may enable performing multimedia applications that may require encryption and/or decryption operations. The encryption and/or decryption operations may be based on the Data Encryption Standard (DES), the Triple DES or 3DES, and/or the Advanced Encryption Standard (AES), for example. General configuration and/or control information to be utilized and/or generated by the processing unit 200 may be communicated via the control bus 116. Moreover, data to be utilized and/or generated by the processing unit 200 may be communicated via the data bus 118.

The secure register 202 may comprise suitable logic, circuitry, and/or code that may enable communication of information with the security processor 102 via the secure control bus 114. In this regard, the secure register 202 may only be read and/or be written by the security processor 102. The secure register 202 may be implemented as a single register or as set of registers, for example. The secure register 202 may be specified based on its functionalities. For example, at least one bit in the security register 202 may be utilized for enabling and/or disabling control of security functions in the processing unit 200. At least one bit in the security register 202 may be utilized for activating and/or deactivating control of security functions in the processing unit 200. At least one bit in the security register 202 may be utilized for controlling a mode of operation. The mode of operation may indicate an input and/or output data routing, allowing and/or disallowing key loading by the security processor 102 and/or the host processor 104, and/or selection of a security algorithm, for example. The key memory 204 may comprise suitable logic, circuitry, and/or code that may enable storing decryption and/or encryption keys communicated from the security processor 102 via the secure key bus 112 and/or from the host processor 104 via the control bus 116. In this regard, the key memory 204 may be implemented utilizing a write-only random access memory (RAM).

Figure 2B:
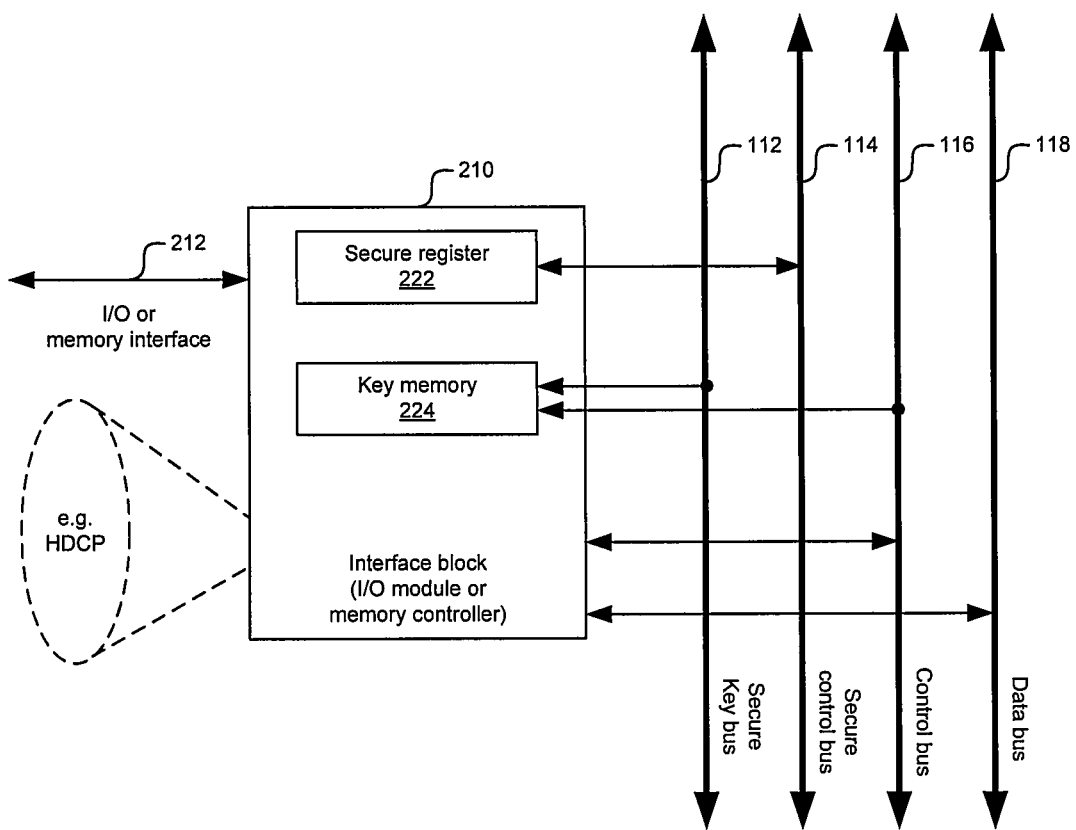
FIG. 2B is a block diagram illustrating an exemplary I/O module or memory controller in a secure multimedia SoC, in accordance with an embodiment of the invention.

FIG. 2B is a block diagram illustrating an exemplary I/O module or memory controller in a secure multimedia SoC, in accordance with an embodiment of the invention. Referring to FIG. 2B, there is shown an interface block 210 that may comprise a secure register 222 and a key memory 224. The interface block 210 may correspond to an I/O module 108 or a memory controller 106 as described in FIG. 1. The interface block 210 may comprise suitable logic, circuitry, and/or code that may enable communication with devices external to the SOC 100 via the interface 212. In this regard, the interface block 210 may perform secure operations on at least a portion of the communicated data. For example, the interface block 210 may enable high bandwidth digital content protection (HDCP) and may utilize a key protection mechanism for secure interfaces to digital displays, such as digital visual interface (DVI) and high definition multimedia interface (HDMI), for example. General configuration and/or control information to be utilized and/or generated by the interface block 210 may be communicated via the control bus 116. Moreover, data to be utilized and/or generated by the interface block 210 may be communicated via the data bus 118.

The secure register 222 and the key memory 224 in the interface block 210 may be the same as or substantially similar to the secure register 202 and the key memory 204 in FIG. 2A, respectively. For example, the secure register 222 may only be read and/or be written to by the security processor 102, may be implemented as a single register or as set of registers, and may be specified based on its functionalities. The key memory 224, for example, may store decryption and/or encryption keys communicated from the security processor 102 via the secure key bus 112 and/or from the host processor 104 via the control bus 116, and may be implemented utilizing a write-only RAM.

Figure 3:
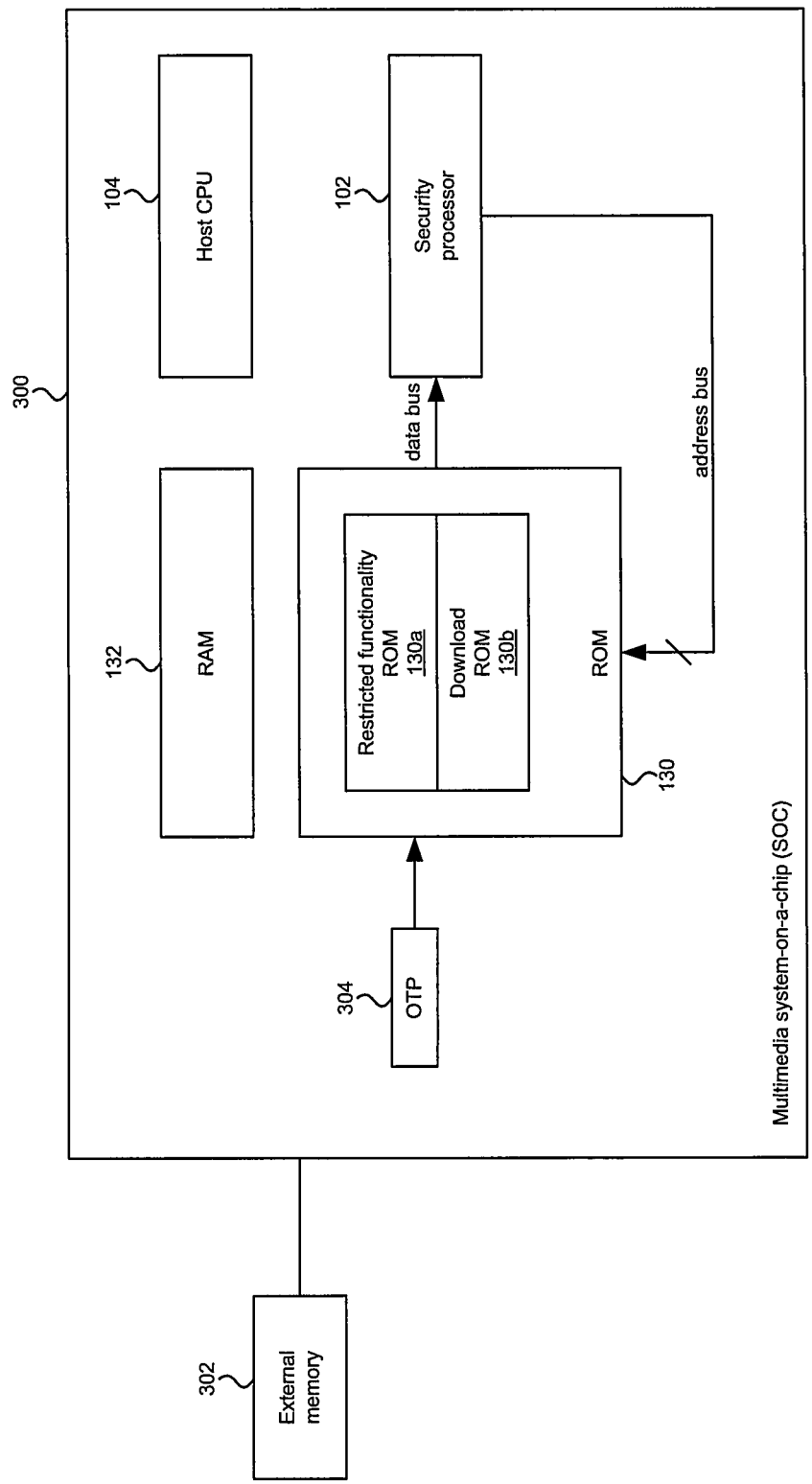
FIG. 3 is block diagram illustrating an exemplary secure multimedia SoC that supports no code download in a code download scheme, in accordance with an embodiment of the invention.

FIG. 3 is block diagram illustrating an exemplary secure multimedia SoC that supports no code download in a code download scheme, in accordance with an embodiment of the invention. Referring to FIG. 3, there is shown a secure multimedia SoC 300 and an external memory 302. The external memory 302 may be a FLASH memory, for example. The multimedia secure SoC 300 may be substantially similar to the SoC 100 in FIG. 1 and may comprise a one-time-programmable (OTP) memory 304, the RAM 132, the host CPU 104, the security processor 102, and the ROM 130. The ROM 130 may be partitioned into a plurality of portions. In the exemplary embodiment of the invention disclosed in FIG. 3, the ROM 130 may be portioned into a first portion 130a and a second portion 130b. The RAM 132, the host CPU 104, the security processor 102, and the ROM 130 may be the same or substantially similar to the components disclosed in FIG. 1.

The OTP 304 may comprise suitable logic, circuitry, and/or code that may enable storage of at least one bit that may be utilize to control portions of the operation of the secure multimedia SoC 300. In this regard, at least one bit in the OTP 304 may be utilized to determine whether the security processor 102 may access the first portion 130a or the second portion 130b of the ROM 130. For example, a single bit in the OTP 304 may be utilized to enable access to half of the storage addresses in the ROM 130 by the security processor 102 via an address bus. When the single bit is high, the security processor 102 may access the upper half of addresses in the ROM 130. When the single bit is low, the security processor 102 may access the lower half of addresses in the ROM 130. Notwithstanding, more than one bit may be utilized to more specifically determine one or more portions of the ROM 130, which the security processor 102 may access via the address bus.

The first portion 130a of the ROM 130 may comprise code or instructions for enabling booting up the secure multimedia SoC 300 and code or instructions for preventing the security processor 102 from enabling proprietary security algorithms that may be integrated within the secure multimedia SoC 300. The first portion 130a of the ROM 130 may be referred to as the restricted functionality ROM, for example. The second portion 130b may comprise code or instructions for enabling the secure multimedia SoC 300 to download proprietary security code from the external memory 302 into local memory for booting up the secure multimedia SoC 300. In this regard, the security code from the external memory 302 may be stored locally in the RAM 132, for example. The second portion 130b may be referred to as the download ROM, for example.

When the security processor 102 accesses the ROM 130 to fetch the appropriate code or instructions to initiate the boot up process, the programmed bit or bits in the OTP 304 may restrict which portion of the ROM 130 is accessed. When the OTP 304 restricts access by the security processor 102 to the first portion 130a, the security processor 102 may receive via a data bus code or instructions for enabling booting up the secure multimedia SoC 300 and code or instructions for preventing the security processor 102 from enabling proprietary security algorithms that may be integrated within the secure multimedia SoC 300. However, when the OTP 304 restricts access by the security processor 102 to the second portion 130*b*, the security processor 102 may receive via the data bus code or instructions for enabling the secure multimedia SoC 300 to download proprietary security code from the external memory 302 into the RAM 132 for booting up the secure multimedia SoC 300.

In some instances, at least a portion of the code or instructions comprised within the ROM 130 may be provided separately from the secure multimedia SoC 300. Separately provided code or instructions may refer to code or instructions that may not be programmed within the ROM 130 but may be provided via a storage medium. For example, a user may program the information into the external storage medium, such as the external memory 302, for later download by the download ROM into internal RAM 132. In this regard, a user may be the chip vendor's customer. In these instances, the code or instructions are said to be visible to the user. In other instances, the code or instructions may be programmed into the secure multimedia SoC 300 by, for example, a manufacturer before it is shipped to the user. In these instances, the code or instructions is said to be invisible to the user.

Figure 4:
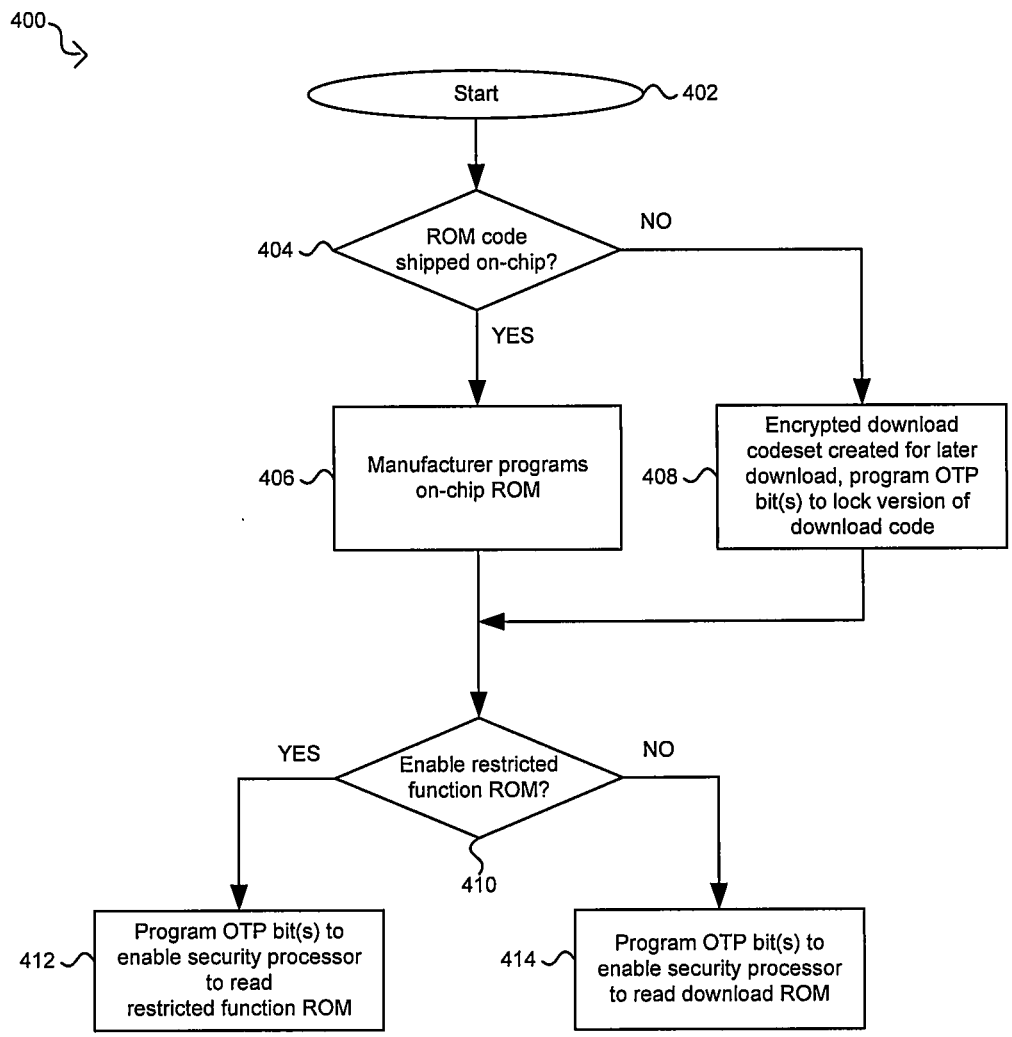
FIG. 4 is a flow diagram illustrating exemplary steps for selecting whether to program download code into a ROM within the secure multimedia SoC, in accordance with an embodiment of the invention.

FIG. 4 is a flow diagram illustrating exemplary steps for selecting whether to program download code into a ROM within the secure multimedia SoC, in accordance with an embodiment of the invention. Referring to FIG. 4, there is shown a flow chart 400. In step 404, after start step 402, when the code for the ROM 130 is to be programmed onto the ROM 130 by, for example, a manufacturer, for shipping the secure multimedia SoC 300 to a user, the process may proceed to step 406. In step 406, the manufacturer, for example, may program the on-chip ROM 130. In step 410, when the secure multimedia SoC 300 is to be shipped to a user that utilizes a restricted or reduced set of the security features or applications supported by the secure multimedia SoC 300, the process may proceed to step 412. In step 412, the manufacturer may program at least one bit in the OTP 304 to restrict access by the security processor 102 to the restricted functionality ROM in the first portion 130*a*. Returning to step 410, when the secure multimedia SoC 300 is to be shipped to a user that utilizes a non-restricted or non-reduced set of the security features or applications supported by the secure multimedia SoC 300, the process may proceed to step 414. In step 414, the manufacturer may program at least one bit in the OTP 304 to restrict access by the security processor 102 to the download ROM in the second portion 130*b*.

Returning to step 404, when the code for the ROM 130 is to be provided separately by, for example, a manufacturer, for shipping the secure multimedia SoC 300 to a user, the process may proceed to step 408. In step 408, encrypted download codeset created for later download onto the SoC 300 may be programmed and at least one bit may be programmed into the OTP 304 to lock the specified version of download code. In this regard, the user code may be copied to internal RAM 132 by utilizing the contents in the download ROM 130*b*, and may be allowed to logically replace the contents associated with the restricted download ROM 130*a*, based on at least one programmed bit in the OTP 304. The downloaded code stored in the internal RAM 132 need not be utilized to replace code stored in the ROM 130, instead it may be utilized for performing operations associated with at least portions of the code stored in the ROM 130. After step 408, the process may proceed to step 410.

Figure 5:
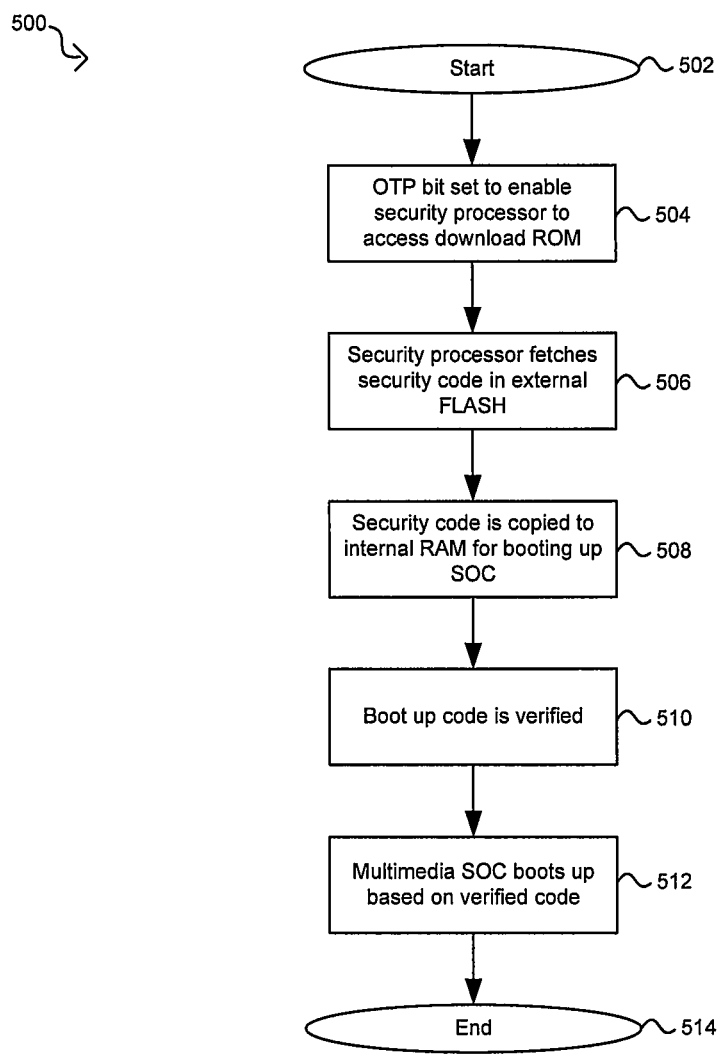
FIG. 5 is a flow diagram illustrating exemplary steps for booting up the secure multimedia SoC with security code download sequence from external memory, in accordance with an embodiment of the invention.

FIG. 5 is a flow diagram illustrating exemplary steps for booting up the secure multimedia SoC with security code download sequence from external memory, in accordance with an embodiment of the invention. Referring to FIG. 5, there is shown a flow diagram 500. In step 504, after start step 502, the OTP 304 may have had at least one bit set to restrict the addresses in the ROM 130 that may be accessed by the security processor 102. In this regard, access by the security processor 102 may be restricted to the second portion 130*b* that comprises the download ROM. The security processor 102 may access the download ROM, which may provide code or instructions for fetching security code that may reside externally to the secure multimedia SoC 300.

In step 506, the security processor 102 may fetch security code from, for example, the external memory 302 disclosed in FIG. 3. In step 508, the security code fetched from the external memory 302 may be stored in the RAM 132 within the secure multimedia SoC 300. In step 510, the security processor 102 may verify the security code stored in the RAM 132. In step 512, the security processor 102 may utilize the verified security code stored in the RAM 132 to boot up the secure multimedia SoC 300. In this regard, the security code may enable at least one of the security features supported by the secure multimedia SoC 300. After step 512, the process may proceed to end step 514.

The security code in the external memory 302 may be updated as part of the maintenance and/or support efforts that may be provided to the user by the manufacturer or producer of the secure multimedia SoC 300. In this regard, the same download ROM in the ROM 130 may be utilized by the security processor 102 to enable fetching original and/or updated versions of the security code stored in the external memory 302.

Figure 6:
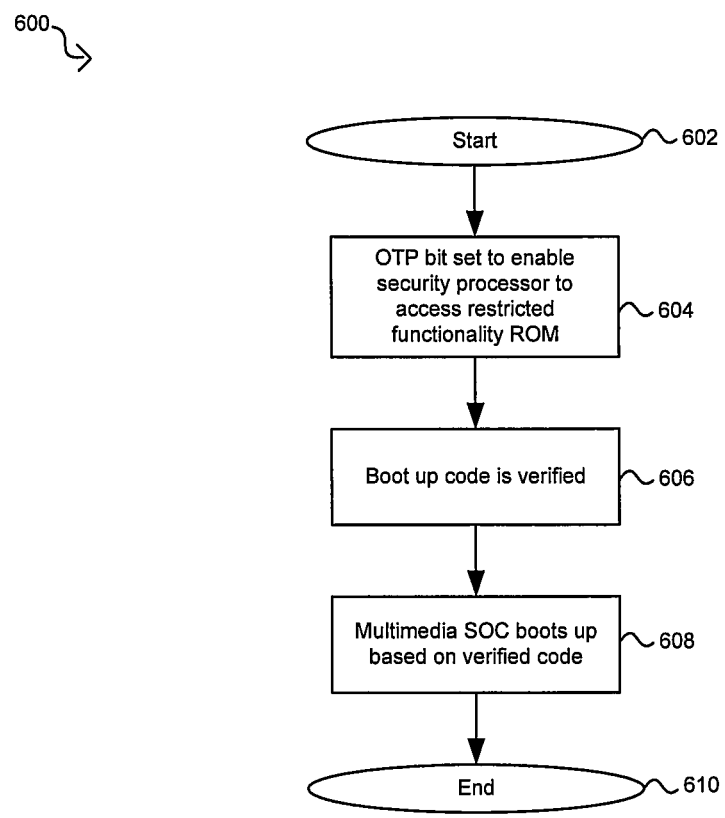
FIG. 6 is a flow diagram illustrating exemplary steps for booting up the secure multimedia SoC without security code download sequence from external memory, in accordance with an embodiment of the invention.

FIG. 6 is a flow diagram illustrating exemplary steps for booting up the secure multimedia SoC without security code download sequence from external memory, in accordance with an embodiment of the invention. Referring to FIG. 6, there is shown a flow diagram 600. In step 604, after start step 602, the OTP 304 may have had at least one bit set to restrict the addresses in the ROM 130 that may be accessed by the security processor 102. In this regard, access by the security processor 102 may be restricted to the first portion 130*a* that comprises the restricted functionality ROM. The security processor 102 may access the restricted functionality ROM, which may provide code or instructions for booting the secure multimedia SoC 300 and code or instructions for preventing the security processor 102 from enabling proprietary security algorithms that may be integrated within the secure multimedia SoC 300.

In step 606, the security processor 102 may verify the code in the restricted functionality ROM for booting up the secure multimedia SoC 300. In step 608, the security processor 102 may utilize the verified code in the restricted functionality ROM to boot the secure multimedia SoC 300 so that a limited or restricted portion of the proprietary security algorithms supported by the secure multimedia SoC 300 may be enabled. After step 608, the process may proceed to end step 610.

Since the approach disclosed in FIG. 6 need not utilize security code stored externally to the secure multimedia SoC 300, maintenance and/or support efforts that may be provided to the user by the manufacturer or producer of the secure multimedia SoC 300 may be significantly reduced.

Aspects of the invention may comprise a system for operating an integrated circuit, the system comprising a system-on-a-chip (SoC), such as the SoC 300 disclosed in FIG. 3. The SoC 300 may comprise a security processor, a ROM, and a one-time-programmable (OTP) memory. In this regard, the security processor, the ROM, and the OTP memory may correspond to the security processor 102, the ROM 130, and the OTP 304, for example. The security processor 102 may enable fetching code from a restricted function portion of the ROM 130. The restricted function portion of the ROM 130 may correspond to the restricted functionality ROM 130a disclosed in FIG. 3. Access to the restricted function portion of the ROM 130 by the security processor 102 may be enabled by at least one bit from the OTP memory 304. In this regard, the restricted function portion in the ROM 130 may comprise code that prevents enabling security algorithms within the SoC 300. The security processor 102 may enable boot of at least a portion of the SoC 300 based on the fetched code from the restricted function portion of the ROM 130.

A remaining portion of the ROM 130 may comprise code for downloading security code from an external memory, such as the external memory 302, to the SoC 300. The remaining portion of the ROM 130 may correspond to the download ROM 130b disclosed in FIG. 3. The external memory 302 may comprise a FLASH memory. Access to the remaining portion of the ROM 130 by the security processor 102 may be enabled by at least one bit from the OTP memory 304. Security code from the external memory 302 may be downloaded into an internal memory within the SoC 300. In this regard, the internal memory may comprise a RAM, such as the RAM 132 disclosed in FIG. 3. At least a portion of the SoC 300 may be booted up based on the security code downloaded into the internal memory.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for operating an integrated circuit, the method comprising:
   fetching a first code by a security processor from a restricted function portion of a ROM in a system-on-a-chip (SoC), wherein access to said restricted function portion of said ROM by said security processor is enabled by at least one bit from a one-time-programmable (OTP) memory and said restricted function portion in said ROM comprises a second code that prevents enabling security algorithms within said SoC; and
   booting at least a portion of said SoC using said first code fetched from said restricted function portion of said ROM.

2. The method according to claim 1, wherein a remaining portion of said ROM comprises a third code for downloading security code from an external memory to said SoC.

3. The method according to claim 2, wherein said external memory comprises FLASH memory.

4. The method according to claim 2, wherein said external memory comprises DRAM memory.

5. The method according to claim 2, wherein access to said remaining portion of said ROM by said security processor is enabled by at least one bit from said OTP memory.

6. The method according to claim 2, wherein said security code from said external memory is downloaded into an internal memory within said SoC.

7. The method according to claim 6, wherein said internal memory comprises RAM.

8. The method according to claim 6, wherein at least a portion of said SoC is booted up based on said security code downloaded into said internal memory.

9. A non-transitory computer readable medium having stored thereon instructions which when executed by a computational device, cause the computational device to:
   fetch a first code by a security processor from a restricted function portion of a ROM in a system-on-a-chip (SoC), wherein access to said restricted function portion of said ROM by said security processor is enabled by at least one bit from a one-time-programmable (OTP) memory, and wherein said restricted function portion in said ROM comprises a second code that prevents enabling security algorithms within said SoC; and
   boot at least a portion of said SoC using said first code fetched from said restricted function portion of said ROM.

10. The non-transitory computer readable medium according to claim 9, wherein a remaining portion of said ROM comprises a third code for downloading security code from an external memory to said SoC.

11. The non-transitory computer readable medium according to claim 10, wherein said external memory comprises FLASH memory.

12. The non-transitory computer readable medium according to claim 10, wherein said external memory comprises DRAM memory.

13. The non-transitory computer readable medium according to claim 10, wherein access to said remaining portion of said ROM by said security processor is enabled by at least one bit from said OTP memory.

14. The non-transitory computer readable medium according to claim 10, wherein said security code from said external memory is downloaded into an internal memory within said SoC.

15. The non-transitory computer readable medium according to claim 14, wherein said internal memory comprises RAM.

16. The non-transitory computer readable medium according to claim 14, wherein at least a portion of said SoC is booted up based on said security code downloaded into said internal memory.

17. A system for operating an integrated circuit, the system comprising:
- a system-on-a-chip (SoC) comprising a security processor, a ROM, and a one-time-programmable (OTP) memory;
- wherein said security processor is configured to fetch a first code from a restricted function portion of said ROM, wherein access to said restricted function portion of said ROM by said security processor is enabled by at least one bit from said OTP memory, wherein said restricted function portion in said ROM comprises a second code that prevents enabling security algorithms within said SoC, and wherein said security processor is further configured to boot at least a portion of said SoC using said first code fetched from said restricted function portion of said ROM.

18. The system according to claim 17, wherein a remaining portion of said ROM comprises a third code for downloading security code from an external memory to said SoC.

19. The system according to claim 18, wherein said external memory comprises FLASH memory.

20. The system according to claim 18, wherein said external memory comprises DRAM memory.

21. The system according to claim 18, wherein access to said remaining portion of said ROM by said security processor is enabled by at least one bit from said OTP memory.

22. The system according to claim 18, wherein said security code from said external memory is downloaded into an internal memory within said SoC.

23. The system according to claim 22, wherein said internal memory comprises RAM.

24. The system according to claim 22, wherein at least a portion of said SoC is booted up based on said security code downloaded into said internal memory.

* * * * *